Patented Sept. 13, 1932

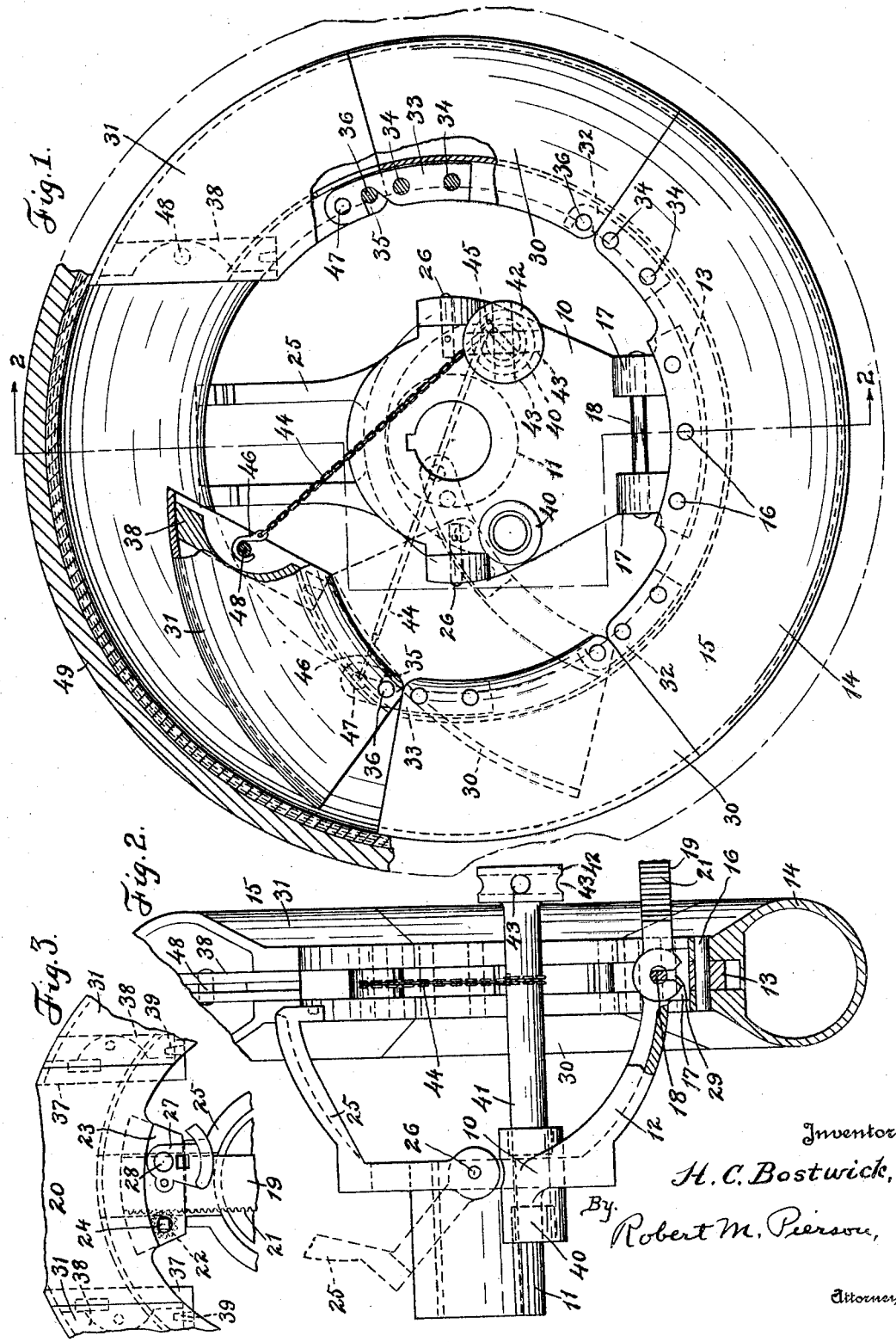

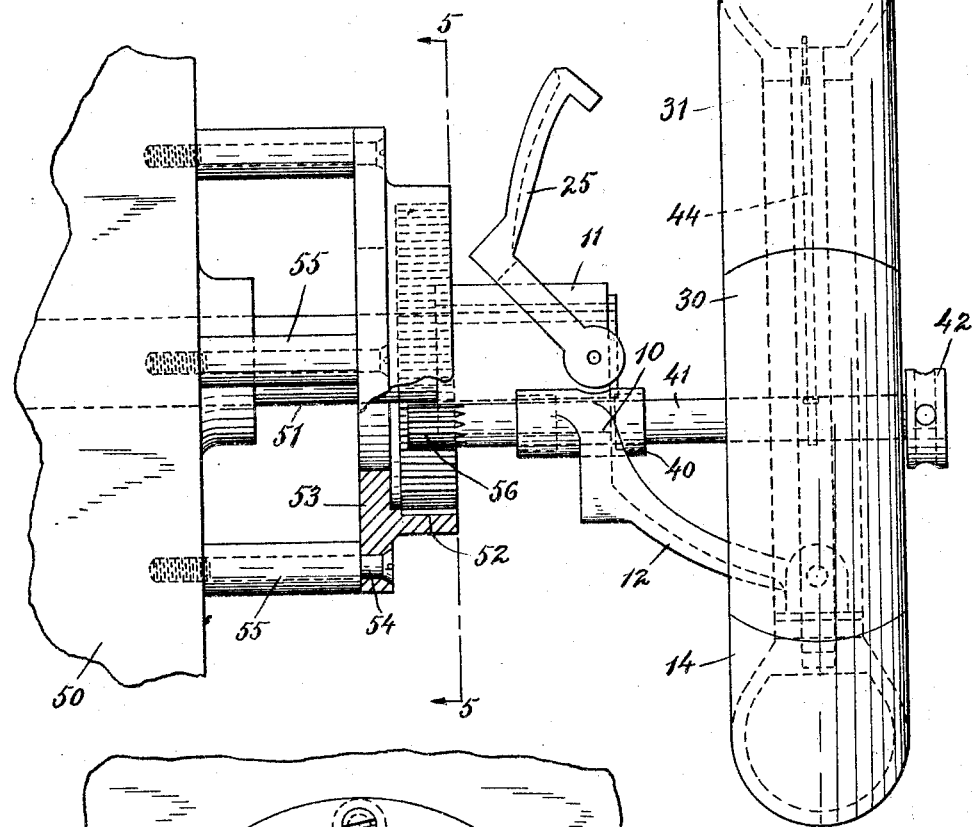

1,877,751

UNITED STATES PATENT OFFICE

HENRY C. BOSTWICK, OF AKRON, OHIO, ASSIGNOR TO THE AKRON STANDARD MOLD COMPANY, OF AKRON, OHIO, A CORPORATION OF OHIO

TIRE CORE EXTRACTOR

Application filed August 20, 1931. Serial No. 558,232.

This invention relates to collapsible tire-building core and chuck devices, and it has for its object to provide an improved means for extracting or withdrawing the core body segments from the interior of the formed tire casing.

The need for such a device is found particularly in the building of tire casings of large section, comparatively stiff walls and beads and relatively small bead diameter, requiring the exertion of considerable force for withdrawing the core segments past the beads into the central free space. Heretofore, rather crude prying tools demanding severe physical labor for their operation have been employed for this purpose. My present invention provides an extracting winch or equivalent mechanism, mountable on the chuck, whereby the operation referred to is greatly facilitated and the muscular effort of the workman reduced.

Of the accompanying drawings, Fig. 1 is a front elevation, partly in section, showing portions of a tire casing, segmental core and chuck assembly, together with an extracting winch, embodying my invention in a practical form and shown in the act of withdrawing one of the core segments.

Fig. 2 is a cross section approximately on the line 2—2 of Fig. 1, together with an additional chuck member.

Fig. 3 is a fragmental front elevation of the upper portion of the core and chuck assembly showing the key segment in its operative position.

Fig. 4 is a side elevation, partly broken away and in section, showing a modification.

Fig. 5 is a cross section on the line 5—5 of Fig. 4.

The core and chuck apparatus here illustrated, except for the means of connecting the core segments, and certain details of the chuck, is of the general character illustrated in my co-pending application Ser. No. 499,309, filed Dec. 1, 1930, now Patent 1,866,994 issued July 12, 1932, and the invention is shown in a form adapted to that style of apparatus, but it will be understood that the invention is also applicable, either with or without substantial modification, to other types of collapsible core and chuck apparatus.

In the drawings, 10 is the central supporting plate of the rotary chuck, formed with a hub 11 having an opening for receiving the shaft of a jack or tire machine, and also formed on one side of the axis of rotation with a forwardly-projecting curved arm 12 having an arcuate terminal member 13 to which the base body segment 14 of the core, designated generally by the numeral 15, is attached by means of rivet pins 16. The chuck arm 12 is further formed with a pair of ears 17 in which is fastened a pin 18 for pivotally supporting one end of a guide bar 19 on which is slidably mounted the key segment 20 of the core, shown in Fig. 3. The bar 19 is provided on one edge with rack-teeth 21 engaged by the teeth of a gear pinion 22 whose short shaft is rotatably supported in a bracket 23 attached to the inner periphery of the key segment and is provided with a squared end 24 for receiving a socket wrench to turn the gear pinion, whereby the key segment 20 may be made to travel radially along its guide bar 19, the free end of the latter projecting into the hollow interior of the segment when said segment is retracted.

When the guide bar 19 is located in its operative position diametrically of the core, it is rearwardly supported by a yoke 25 pivoted at 26 to the central chuck plate and adapted to swing back out of operative position, as shown in broken lines in Fig. 2 and in full lines in Fig. 1. In the operative position of these parts, the key segment 20 is located in its outward position on the guide bar 19 and the two are locked to the supporting yoke 25 by means of a latch 27 pivoted at 28 on the key segment bracket 23, substantially as disclosed in my aforesaid prior application. Also as disclosed in said application, the guide bar 19, after the key segment 20 has been withdrawn radially from between the adjoining body segments to free it from the tire, is adapted to swing outwardly on the pin or pivot coupling member 18, substantially into the horizontal position illustrated in Fig. 2, so that the hinged body segments may then be withdrawn.

In this case, I have further shown the hub of the guide bar 19 as formed with an opening 29 in one side thereof, and the pin 18 as flattened on two sides parallel with the plane of the core, so that when said guide bar has been swung out to its horizontal position, its pivoted end may then be lifted inwardly free of the pin 18 and said bar, together with the key segment 20, its gear pinion 22 and the latch 27, may then be removed as a unit from the chuck to facilitate the operation of the extracting winch which will hereinafter be described.

The remaining core sections are a pair of intermediate body segments 30 hingedly and detachably connected with the ends of the base segment 14, and a pair of terminal body segments 31 in like manner connected with the ends of the segments 30 and adapted to receive the key segment in sliding engagement between them, as illustrated in Fig. 3. The connection between the body segments may be effected in any suitable manner, preferably as here shown, by means of hooked plates 32, 33 having their shanks fixed by rivet pins 34 in an inner peripheral groove in one of a pair of adjoining segments, and their hooked ends projecting circumferentially beyond said segment and each formed with an inwardly-open recess 35 to receive the pivot pin 36 of the neighboring segment. The ends of the segments 31 are registered with those of the key segment 20 by the usual tongue-and-groove connection formed on radial blocks 37, 38 respectively inset in the ends of said segments and cast or welded to the walls thereof. The blocks 37 are made L-shaped with short arms at their inner ends projecting under the blocks 38 and provided with dowel pins 39 for engagement in complemental holes in the blocks 38 to hold the key segment against circumferential separation from the segments 31.

The central supporting plate 10 of the chuck is provided with a pair of integral bearing sleeves 40 suitably bushed to act as shaft bearings and radially spaced from the central shaft opening of said plate at equal distances on opposite sides of an axial plane passing through the middle of the key segment. Either one of these bearing sleeves is adapted to receive the rear end of a shaft 41 whose forward portion acts as a winch drum or barrel and whose forward extremity is formed with a head 42 provided with holes 43 drilled through it radially at right angles to receive a turning bar or handle for rotating the shaft 41.

One end of a suitable flexible tractor member, such as a chain 44, is attached by a pin 45 to the periphery of the shaft 41 and the other end of said chain is provided with a hook 46 for detachably connecting it with the ends of the respective removable body segments 30, 31. This connection of course could be made in various ways. For the segments 30 I have shown their hooked coupling members 33 circumferentially extended and each formed with an eye or aperture 47 through which the hook 46 may be engaged, as shown in broken lines at the left in Fig. 1. For each of the segments 31 there may be a transverse pin 48 mounted in the block 38 across a recess milled therein at the bottom of the tongue groove for engagement with the hook 46.

While I do not wholly limit myself to the provision of a pair of alternately usable bearings 40 for the winch shaft, it will be observed that the arrangement shown facilitates the removal of the core segments by the exertion of a pull nearly at right angles, through a maximum distance, from the side of the chuck opposite to that on which the segment is located.

In the operation of this apparatus, after building on the complete core a tire casing 49, of which a portion is shown in Fig. 1, the key segment 20 is withdrawn radially inward between the beads, in the manner previously indicated, by rolling the gear pinion 22 down over the rack 21 after releasing the latch 27 and turning back the supporting yoke 25, whereupon the guide bar 19 is swung outwardly to a position substantially at right angles to the plane of the core, as indicated in Fig. 2, and the key segment and guide bar assembly is then removed as a unit by disconnecting the bar from its pivot pin 18 through the opening 29. The rear end of the winch or windlass shaft 41 is then inserted in that one of the bearings 40 on the side of the chuck opposite to the segments which are first to be withdrawn, the hook 46 on the tractor chain is coupled with the pin 48 of the terminal segment 31 on the opposite side, a turning bar or handle is placed through one of the apertures 43 in the shaft head and the shaft 41 is rotated to wrap the chain around it, thereby drawing the free end of the segment 31 inwardly between the beads with a minimum of muscular effort and causing it to turn about the pivot pin 36 at its opposite end. As said segment straightens into line with chain, its pivot pin 30 is pulled out of the hook opening 35 by the action of the winch, or this final disconnection may be performed manually on the segment if preferred. Said segment is thus taken completely out of the tire and is laid aside after unhooking the chain therefrom. The chain hook 46 is next coupled through the eye 47 of the adjoining segment 30 on the same side and the latter is extracted by the winch in a similar manner, the winch shaft being removed from its bearing before uncoupling the chain if necessary to permit a final manual removal. After the two segments on one side have been thus removed, the winch shaft is shifted to the opposite bearing 40 and the segments 31 and 30 on the other side are successively removed in the same manner. The tire casing may then be easily slipped off from the base segment 14 which remains in place on the chuck.

It will be understood that the relative rotation of the winch shaft 41 in either of its bearings 40, for performing the extracting operation, may also be brought about by rotating the tire core and holding said shaft against actual rotation by means of the handle applied to its head 42 while the shaft revolves with the chuck around the central axis.

In the modification shown in Figs. 4 and 5, I have illustrated a mechanism for applying the power which rotates the core and chuck to the operation of the winch. 50 is the casing of the tire-building machine from which projects the horizontal power shaft 51 on which the chuck is mounted. 52 is a stationary internal gear concentric with said shaft and formed on a flanged base 53 secured to the frame 50 in a suitable manner, as by means of screws 54 and spacer sleeves 55. A gear pinion 56 formed on the rear end of the winch shaft 41 can be meshed with the teeth of the internal gear by the longitudinal insertion of said winch shaft through either of its bearings 40, and when it is thus positioned, the planetary revolution of said winch shaft and its pinion around the central axis as the chuck and core are rotated by means of the shaft 51 will cause said winch shaft to rotate relatively to the core, thus winding up the chain 44 and extracting the core segment to which it is attached without requiring any muscular effort of the workman to produce the winding action.

It will be understood that the form of embodiment may be further modified and that its design and mode of mounting may be altered as required to adapt it to chucks and cores of various types without departing from the scope of the invention as defined in the claims.

I claim:

1. The combination with a chuck and a collapsible tire-building core including a key segment and body segments, of means mounted on the chuck for withdrawing the key segment from between the body segments, and independent winch means mounted on said chuck for withdrawing the body segments from the tire after the key segment has been withdrawn from between the body segments.

2. The combination of a chuck, a tire core mounted thereon and including hinged body segments and a key segment slidable into and out of the space between said body segments, and a winch mounted on the chuck and having a tractor member attachable to the body segments for extracting the latter between the tire beads after the key segment has been withdrawn.

3. The combination of a collapsible tire core and chuck assembly including hinged body segments together with a slidable key segment and its supporting and power-multiplying operating means removable as a unit from the chuck, and independent extracting means removably mounted on the chuck for withdrawing the body segments between the tire beads after removal of said key segment unit.

4. The combination of a chuck, a collapsible tire core thereon including a pair of segments one of which is detachably hinged to the other and separable therefrom by an uncoupling movement of the first segment in the plane of the tire after being swung inwardly and while the other segment remains in the tire, and a winch mounted on the chuck for swinging the first segment inwardly between the tire beads preparatory to uncoupling it.

5. The combination of a chuck and tire core assembly including a base body segment and intermediate body segments detachably hinged thereto by means including opensided hinge members so as to be individually removable, together with a slidable key segment and means removably mounted on the chuck for withdrawing said intermediate body segments between the tire beads after withdrawal of said key segment.

6. The combination of a tire core chuck having means for supporting a segmental core and its key segment operating mechanism, a bearing on said chuck, and a winch including a drum and shaft member detachably mounted to turn in said bearing, and a tractor member for attachment to the core body segments for the purpose of withdrawing the latter from the tire.

7. The combination of a collapsible tire core and chuck assembly including a chuck formed to receive a removable winch, and one or more core body segments formed for detachable connection with the tractor member of said winch.

8. The combination of a rotary chuck including a central support for mounting on a shaft and having means for supporting a segmental core and also having a pivot coupling member for detachably supporting its key segment operating mechanism, said support being provided with a pair of bearings placed around the axis of rotation on opposite sides of said pivot coupling member for receiving a winch shaft in alternative positions for the purpose of withdrawing core segments from opposite sides of the tire.

9. The combination of a rotary chuck including a central support, a segmental core mounted on the chuck forwardly of said support and including hinged body segments and a slidable key segment, and a winch including a tractor member for attachment to the body segments to withdraw the latter, and a drum shaft having its rear end rotatably mounted on said central support of the chuck and its forward end formed to receive a turning handle.

10. Tire-building apparatus comprising a chuck and segmental core assembly, and a winch combined with the chuck and including a rotary winding member and a flexible tractor member for withdrawing the core segments from a formed tire.

11. A segment-extracting winch for collapsible tire cores comprising a shaft formed at one end to receive a turning handle and at its other end for detachably mounting in a bearing and having an intermediate winding portion and a flexible tractor member attached to said winding portion and having a hook at its free end.

12. The combination with a chuck and a collapsible tire-building core mounted thereon and including a detachable segment, of means operated by the rotation of said chuck for extracting said segment from a tire casing formed on the core.

13. The combination with a rotary chuck and a segmental collapsible tire core mounted thereon, of a winch including a shaft having its rear portion detachably assembled with said chuck for withdrawing the core segments, and means connectible with said rear portion for relatively rotating said winch shaft within the core as the chuck is rotated.

14. The combination with a rotary chuck and a segmental core carried thereby, of a stationary gear and a segment-extracting winch including a shaft having a gear meshing with said stationary gear.

15. The combination with a rotary chuck and a segmental core carried thereby, of a stationary internal gear and a segment-extracting winch including a shaft detachably assembled with said chuck and having a gear pinion at its rear end connectible with said internal gear by the longitudinal assembling movement of said shaft.

16. A segment-extracting winch for collapsible tire cores comprising a flexible tractor, and a winch shaft attached thereto for detachable assembly with the core chuck and having a gear pinion at its rear end for meshing with a mating gear.

In witness whereof I have hereunto set my hand this 18th day of August, 1931.

HENRY C. BOSTWICK.